United States Patent
Spurlock et al.

(10) Patent No.: US 10,083,295 B2
(45) Date of Patent: Sep. 25, 2018

(54) SYSTEM AND METHOD TO COMBINE MULTIPLE REPUTATIONS

(71) Applicant: McAfee, LLC, Plano, TX (US)

(72) Inventors: Joel R. Spurlock, Portland, OR (US); John D. Teddy, Portland, OR (US)

(73) Assignee: McAfee, LLC, Plano, TX (US)

( * ) Notice: Subject to any disclaimer, the term of this patent is extended or adjusted under 35 U.S.C. 154(b) by 0 days.

(21) Appl. No.: 14/581,965

(22) Filed: Dec. 23, 2014

(65) Prior Publication Data

US 2016/0180084 A1 Jun. 23, 2016

(51) Int. Cl.
*H04L 29/06* (2006.01)
*G06F 21/55* (2013.01)
*G06F 21/56* (2013.01)

(52) U.S. Cl.
CPC ............ *G06F 21/552* (2013.01); *G06F 21/56* (2013.01); *H04L 63/1441* (2013.01); *G06F 2221/033* (2013.01)

(58) Field of Classification Search
CPC .. G06F 21/552; G06F 21/56; G06F 2221/033; H04L 63/20; H04L 63/1441
USPC .......................................................... 726/23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,725,031 B2 * | 4/2004 | Watler | H04L 12/14 379/114.01 |
| 7,065,494 B1 * | 6/2006 | Evans | G06Q 10/06393 370/248 |
| 7,296,284 B1 * | 11/2007 | Price | G06F 17/30828 348/563 |
| 7,467,206 B2 * | 12/2008 | Moore | G06F 17/30864 707/E17.108 |
| 7,506,155 B1 | 3/2009 | Stewart et al. | |
| 7,523,137 B2 * | 4/2009 | Kass | G06F 17/30539 |
| 7,707,192 B1 * | 4/2010 | Lu | G06Q 10/00 707/687 |
| 7,818,343 B1 * | 10/2010 | Sekhar | G06Q 10/10 707/781 |
| 8,180,783 B1 * | 5/2012 | Fletcher | G06F 17/30684 707/723 |
| 8,312,539 B1 * | 11/2012 | Nachenberg | G06F 21/554 713/188 |

(Continued)

FOREIGN PATENT DOCUMENTS

KR 10-2014-0127178 A 11/2014
WO WO 2016/105826 A1 6/2016

OTHER PUBLICATIONS

International Search Report and Written Opinion in International Application No. PCT/US2015/062597 dated Mar. 14, 2016, 11 pages.

(Continued)

*Primary Examiner* — David Garcia Cervetti
(74) *Attorney, Agent, or Firm* — Patent Capital Group

(57) ABSTRACT

Particular embodiments described herein provide for an electronic device that can be configured to acquire a plurality of reputations related to an object and combine the plurality of reputations to create a total reputation for the object. The object can include a plurality of sub-objects and each of the plurality of reputations can correspond to one of the sub-objects.

19 Claims, 8 Drawing Sheets

(56) References Cited

U.S. PATENT DOCUMENTS

| | | | | |
|---|---|---|---|---|
| 8,359,632 B2* | 1/2013 | Guo | G06Q 10/107 | 726/3 |
| 8,438,469 B1* | 5/2013 | Scott | G06F 17/24 | 715/230 |
| 8,499,063 B1* | 7/2013 | Satish | G06F 8/62 | 709/220 |
| 8,554,601 B1* | 10/2013 | Marsh | G06Q 30/02 | 705/7.32 |
| 8,627,476 B1* | 1/2014 | Satish | G06F 21/51 | 713/187 |
| 8,671,449 B1* | 3/2014 | Nachenberg | H04L 63/145 | 713/187 |
| 8,683,585 B1* | 3/2014 | Chen | G06F 21/56 | 726/22 |
| 8,719,352 B2* | 5/2014 | Krasser | G06F 21/552 | 709/203 |
| 8,763,113 B2* | 6/2014 | Thomas | G06F 17/30657 | 726/11 |
| 8,776,225 B2* | 7/2014 | Pierson | H04L 63/08 | 726/23 |
| 8,832,832 B1* | 9/2014 | Visbal | H04L 63/1441 | 726/22 |
| 8,839,432 B1 | 9/2014 | Patil | | |
| 8,875,285 B2* | 10/2014 | Cross | G06F 21/51 | 726/22 |
| 8,965,970 B2* | 2/2015 | Cathcart | G06F 17/30861 | 707/706 |
| 9,002,333 B1* | 4/2015 | Tong | H04M 3/4211 | 379/142.06 |
| 9,015,263 B2* | 4/2015 | Styler | G06F 17/3097 | 705/26.1 |
| 9,135,573 B1* | 9/2015 | Rodriguez | G06N 7/005 | |
| 9,185,118 B1* | 11/2015 | Agrawal | G06F 21/55 | |
| 9,268,965 B2* | 2/2016 | Hom | G06Q 10/10 | |
| 9,319,382 B2* | 4/2016 | Don, Jr. | H04L 63/0236 | |
| 9,361,353 B1* | 6/2016 | Aristides | G06F 17/30595 | |
| 9,384,501 B2* | 7/2016 | Capuozzo | G06Q 30/0276 | |
| 9,385,869 B1* | 7/2016 | Satish | H04L 9/3247 | |
| 9,544,272 B2* | 1/2017 | Alperovitch | H04L 63/0227 | |
| 9,560,028 B1* | 1/2017 | Salehpour | H04L 63/08 | |
| 9,639,693 B2* | 5/2017 | Rivera | G06F 21/51 | |
| 9,729,662 B2* | 8/2017 | Mahadevan | H04L 67/2842 | |
| 9,917,864 B2* | 3/2018 | Kraemer | H04L 63/20 | |
| 2002/0087526 A1* | 7/2002 | Rao | G06F 17/30867 | |
| 2002/0133365 A1* | 9/2002 | Grey | G06Q 30/02 | 705/7.29 |
| 2002/0193066 A1* | 12/2002 | Connelly | H04H 60/06 | 455/2.01 |
| 2002/0194585 A1* | 12/2002 | Connelly | H04N 5/44543 | 725/9 |
| 2003/0037074 A1* | 2/2003 | Dwork | G06F 17/30864 | 715/229 |
| 2003/0156707 A1* | 8/2003 | Brown | H04M 3/42 | 379/265.06 |
| 2005/0052998 A1* | 3/2005 | Oliver | H04L 12/2602 | 370/231 |
| 2006/0026123 A1* | 2/2006 | Moore | G06F 9/5055 | |
| 2006/0161472 A1* | 7/2006 | Weild, IV | G06Q 40/00 | 705/1.1 |
| 2006/0242309 A1* | 10/2006 | Damick | G06F 17/30699 | 709/229 |
| 2006/0253581 A1* | 11/2006 | Dixon | G06F 17/30861 | 709/225 |
| 2006/0253584 A1* | 11/2006 | Dixon | G06Q 30/02 | 709/225 |
| 2007/0043738 A1* | 2/2007 | Morris | G06F 9/50 | |
| 2007/0086592 A1* | 4/2007 | Ellison | H04L 63/101 | 380/282 |
| 2007/0100824 A1* | 5/2007 | Richardson | G06F 17/30864 | |
| 2007/0130350 A1* | 6/2007 | Alperovitch | H04L 63/1425 | 709/229 |
| 2007/0130351 A1* | 6/2007 | Alperovitch | H04L 12/585 | 709/229 |
| 2007/0179834 A1* | 8/2007 | Carter | G06Q 30/0201 | 705/7.29 |
| 2007/0203852 A1* | 8/2007 | Cameron | G06Q 20/367 | 705/75 |
| 2007/0214506 A1* | 9/2007 | Rao | H04L 12/585 | 726/25 |
| 2007/0244974 A1* | 10/2007 | Chasin | G06Q 10/107 | 709/206 |
| 2007/0260526 A1* | 11/2007 | Bartel | G06Q 10/02 | 705/5 |
| 2007/0282952 A1* | 12/2007 | Lund | G06Q 10/107 | 709/206 |
| 2008/0005064 A1* | 1/2008 | Sarukkai | G06F 17/241 | |
| 2008/0022384 A1* | 1/2008 | Yee | H04L 63/0263 | 726/11 |
| 2008/0072049 A1* | 3/2008 | Cross | G06F 21/51 | 713/176 |
| 2008/0082662 A1* | 4/2008 | Dandliker | H04L 63/10 | 709/225 |
| 2008/0140441 A1* | 6/2008 | Warner | G06Q 10/00 | 705/26.1 |
| 2008/0141366 A1* | 6/2008 | Cross | G06F 21/6218 | 726/21 |
| 2008/0162278 A1* | 7/2008 | Hershkovitz | G06Q 30/0269 | 705/14.66 |
| 2008/0175226 A1* | 7/2008 | Alperovitch | H04L 51/12 | 370/352 |
| 2008/0175266 A1* | 7/2008 | Alperovitch | G06F 21/554 | 370/465 |
| 2008/0177691 A1* | 7/2008 | Alperovitch | H04L 51/12 | 706/48 |
| 2008/0178259 A1* | 7/2008 | Alperovitch | G06Q 30/0633 | 726/2 |
| 2008/0178288 A1* | 7/2008 | Alperovitch | H04L 63/0227 | 726/22 |
| 2008/0189733 A1* | 8/2008 | Apostolopoulos | H04N 7/17318 | 725/28 |
| 2008/0222062 A1* | 9/2008 | Liu | G06F 17/3053 | 706/15 |
| 2008/0244744 A1* | 10/2008 | Thomas | H04L 63/1408 | 726/23 |
| 2008/0256619 A1* | 10/2008 | Neystadt | G06F 21/552 | 726/11 |
| 2008/0256622 A1* | 10/2008 | Neystadt | H04L 63/1416 | 726/14 |
| 2009/0119740 A1* | 5/2009 | Alperovitch | H04L 63/20 | 726/1 |
| 2009/0125382 A1* | 5/2009 | Delepet | G06F 17/30864 | 705/347 |
| 2009/0125980 A1* | 5/2009 | Alperovitch | H04L 63/126 | 726/3 |
| 2009/0170608 A1* | 7/2009 | Herrmann | G06Q 30/02 | 463/42 |
| 2009/0187442 A1* | 7/2009 | Kohanim | G06F 21/577 | 705/7.32 |
| 2009/0187988 A1* | 7/2009 | Hulten | H04L 63/102 | 726/22 |
| 2009/0248661 A1* | 10/2009 | Bilenko | G06F 17/30864 | |
| 2009/0254499 A1* | 10/2009 | Deyo | G06Q 10/10 | 706/12 |
| 2009/0254993 A1* | 10/2009 | Leone | G06F 21/51 | 726/25 |
| 2009/0287819 A1* | 11/2009 | Iverson | H04L 9/32 | 709/225 |
| 2010/0082419 A1* | 4/2010 | Au-Yeung | G06Q 30/00 | 705/14.19 |
| 2010/0100871 A1* | 4/2010 | Celeskey | G06F 11/3688 | 717/124 |
| 2010/0115040 A1* | 5/2010 | Sargent | G06Q 10/10 | 709/206 |
| 2010/0153185 A1* | 6/2010 | Ghosh | G06Q 10/04 | 705/7.11 |

(56) References Cited

U.S. PATENT DOCUMENTS

| | | | |
|---|---|---|---|
| 2010/0169301 A1* | 7/2010 | Rubanovich | G06F 17/3089 707/709 |
| 2010/0211997 A1* | 8/2010 | McGeehan | G06F 21/316 726/4 |
| 2010/0269168 A1* | 10/2010 | Hegli | G06F 21/577 726/11 |
| 2010/0293034 A1* | 11/2010 | Olejniczak | G06F 17/30864 705/14.45 |
| 2011/0004608 A1* | 1/2011 | Solaro | G06F 17/30864 707/759 |
| 2011/0004693 A1* | 1/2011 | Rehfuss | G06Q 30/02 709/229 |
| 2011/0040825 A1* | 2/2011 | Ramzan | G06F 21/55 709/203 |
| 2011/0191310 A1* | 8/2011 | Liao | G06F 17/30616 707/706 |
| 2011/0191342 A1* | 8/2011 | Cohen | G06Q 30/02 707/737 |
| 2011/0199902 A1* | 8/2011 | Leavy | H04L 43/0876 370/232 |
| 2011/0296519 A1* | 12/2011 | Ide | G06F 21/30 726/13 |
| 2012/0016678 A1* | 1/2012 | Gruber | G06F 17/3087 704/275 |
| 2012/0131013 A1* | 5/2012 | Hobbs | G06F 17/30283 707/748 |
| 2012/0144481 A1* | 6/2012 | Manianchira | H04L 63/1441 726/22 |
| 2012/0174219 A1* | 7/2012 | Hernandez | G06F 21/562 726/22 |
| 2012/0254076 A1* | 10/2012 | Yang | G06F 17/30274 706/12 |
| 2012/0284282 A9* | 11/2012 | Ghosh | G06F 17/30699 707/748 |
| 2012/0291087 A1* | 11/2012 | Agrawal | G06F 21/55 726/1 |
| 2012/0303635 A1* | 11/2012 | Summers | G06Q 30/018 707/748 |
| 2012/0311703 A1* | 12/2012 | Yanovsky | G06F 21/552 726/22 |
| 2013/0007014 A1* | 1/2013 | Fertik | G06Q 90/00 707/748 |
| 2013/0007870 A1* | 1/2013 | Devarajan | H04L 63/1416 726/11 |
| 2013/0014253 A1* | 1/2013 | Neou | H04L 63/1441 726/22 |
| 2013/0046707 A1* | 2/2013 | Maskatia | H04N 21/4622 705/347 |
| 2013/0060648 A1* | 3/2013 | Maskatia | G06Q 30/02 705/22 |
| 2013/0097659 A1* | 4/2013 | Das | G06F 21/629 726/1 |
| 2013/0097660 A1* | 4/2013 | Das | H04L 63/10 726/1 |
| 2013/0139245 A1* | 5/2013 | Thomas | H04L 63/0227 726/13 |
| 2013/0144593 A1* | 6/2013 | Och | G06F 17/2845 704/2 |
| 2013/0144749 A1* | 6/2013 | Rothley | G06Q 30/0623 705/26.7 |
| 2013/0185799 A1* | 7/2013 | Pfeifer | G06F 21/57 726/24 |
| 2013/0212033 A1* | 8/2013 | Work | G06Q 10/00 705/321 |
| 2013/0246605 A1* | 9/2013 | Mahadik | H04L 63/1433 709/224 |
| 2013/0275164 A1* | 10/2013 | Gruber | G10L 17/22 705/5 |
| 2013/0312097 A1* | 11/2013 | Turnbull | G06F 21/55 726/24 |
| 2013/0325660 A1* | 12/2013 | Callaway | G06Q 30/0609 705/26.35 |
| 2014/0013241 A1* | 1/2014 | Brown | G06Q 30/02 715/753 |
| 2014/0074560 A1* | 3/2014 | B'Far | G06Q 50/01 705/7.38 |
| 2014/0143825 A1* | 5/2014 | Behrendt | G06F 21/552 726/1 |
| 2014/0173723 A1* | 6/2014 | Singla | H04L 63/1408 726/22 |
| 2014/0244660 A1* | 8/2014 | Lewis | G06F 17/30864 707/748 |
| 2014/0283065 A1* | 9/2014 | Teddy | H04L 63/145 726/23 |
| 2014/0283066 A1* | 9/2014 | Teddy | G06F 21/51 726/23 |
| 2014/0289853 A1* | 9/2014 | Teddy | H04L 63/1416 726/23 |
| 2014/0330759 A1* | 11/2014 | Hegli | G06N 99/005 706/12 |
| 2014/0331280 A1* | 11/2014 | Porras | H04L 63/20 726/1 |
| 2014/0337358 A1* | 11/2014 | Mitra | G06N 5/041 707/748 |
| 2014/0366144 A1* | 12/2014 | Alperovitch | G06F 21/554 726/25 |
| 2015/0007315 A1* | 1/2015 | Rivera | G06F 21/51 726/23 |
| 2015/0019455 A1* | 1/2015 | Hilbush | G06Q 10/083 705/337 |
| 2015/0026706 A1* | 1/2015 | Leamon | H04N 21/251 725/9 |
| 2015/0040218 A1* | 2/2015 | Alperovitch | H04L 63/0227 726/22 |
| 2015/0052122 A1* | 2/2015 | Landry | G06F 11/0706 707/723 |
| 2015/0066678 A1* | 3/2015 | Ogilvie | G06Q 30/0633 705/26.3 |
| 2015/0082335 A1* | 3/2015 | Cobb | H04N 21/4542 725/28 |
| 2015/0088666 A1* | 3/2015 | Lefkowitz | G06Q 30/0276 705/14.72 |
| 2015/0096018 A1* | 4/2015 | Mircescu | G06F 21/56 726/23 |
| 2015/0101008 A1* | 4/2015 | Zent | H04L 63/20 726/1 |
| 2015/0106362 A1* | 4/2015 | Dassa | G06F 17/30893 707/723 |
| 2015/0106942 A1* | 4/2015 | Borghetti | G06F 21/577 726/25 |
| 2015/0134636 A1* | 5/2015 | Rubanovich | G06F 17/30598 707/709 |
| 2015/0135277 A1* | 5/2015 | Vij | H04L 63/0892 726/4 |
| 2015/0161112 A1* | 6/2015 | Galvez | G06F 17/3053 704/7 |
| 2015/0234824 A1* | 8/2015 | Arngren | G06F 17/30867 707/748 |
| 2015/0234916 A1* | 8/2015 | Damick | G06F 17/30601 707/738 |
| 2015/0278220 A1* | 10/2015 | Enstrom | G06F 17/3053 707/751 |
| 2015/0319261 A1* | 11/2015 | Lonas | H04L 67/2852 709/216 |
| 2015/0332361 A1* | 11/2015 | Meister | G06Q 10/02 705/26.35 |
| 2015/0343313 A1* | 12/2015 | Kaleta | A63F 13/79 463/29 |
| 2015/0347901 A1* | 12/2015 | Cama | G06N 5/022 707/728 |
| 2015/0356093 A1* | 12/2015 | Abbas | G06F 17/30058 707/748 |
| 2015/0370801 A1* | 12/2015 | Shah | G06F 17/3053 707/728 |
| 2016/0014081 A1* | 1/2016 | Don, Jr. | H04L 63/0236 726/11 |
| 2016/0036833 A1* | 2/2016 | Ardeli | H04L 63/101 726/22 |

(56) References Cited

U.S. PATENT DOCUMENTS

| | | | |
|---|---|---|---|
| 2016/0048516 A1* | 2/2016 | Guiliano | G06F 17/3053 707/748 |
| 2016/0071058 A1* | 3/2016 | Galuten | G06Q 10/101 705/80 |
| 2016/0080417 A1* | 3/2016 | Thomas | H04L 63/20 726/1 |
| 2016/0092469 A1* | 3/2016 | Mukherjee | G06F 17/30241 705/325 |
| 2016/0117695 A1* | 4/2016 | Fuller | G06Q 10/101 705/7.32 |
| 2016/0179849 A1* | 6/2016 | Dubois | G06F 17/30292 707/803 |
| 2016/0197941 A1* | 7/2016 | Smith | H04L 63/1408 726/22 |

OTHER PUBLICATIONS

International Preliminary Report on Patentability in International Application No. PCT/US2015/062597 dated Jun. 27, 2017.

\* cited by examiner

SYSTEM AND METHOD TO COMBINE MULTIPLE REPUTATIONS

TECHNICAL FIELD

This disclosure relates in general to the field of information security, and more particularly, to combine multiple reputations.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices. One system for protecting computers and computer networks includes assigning a reputation to process and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
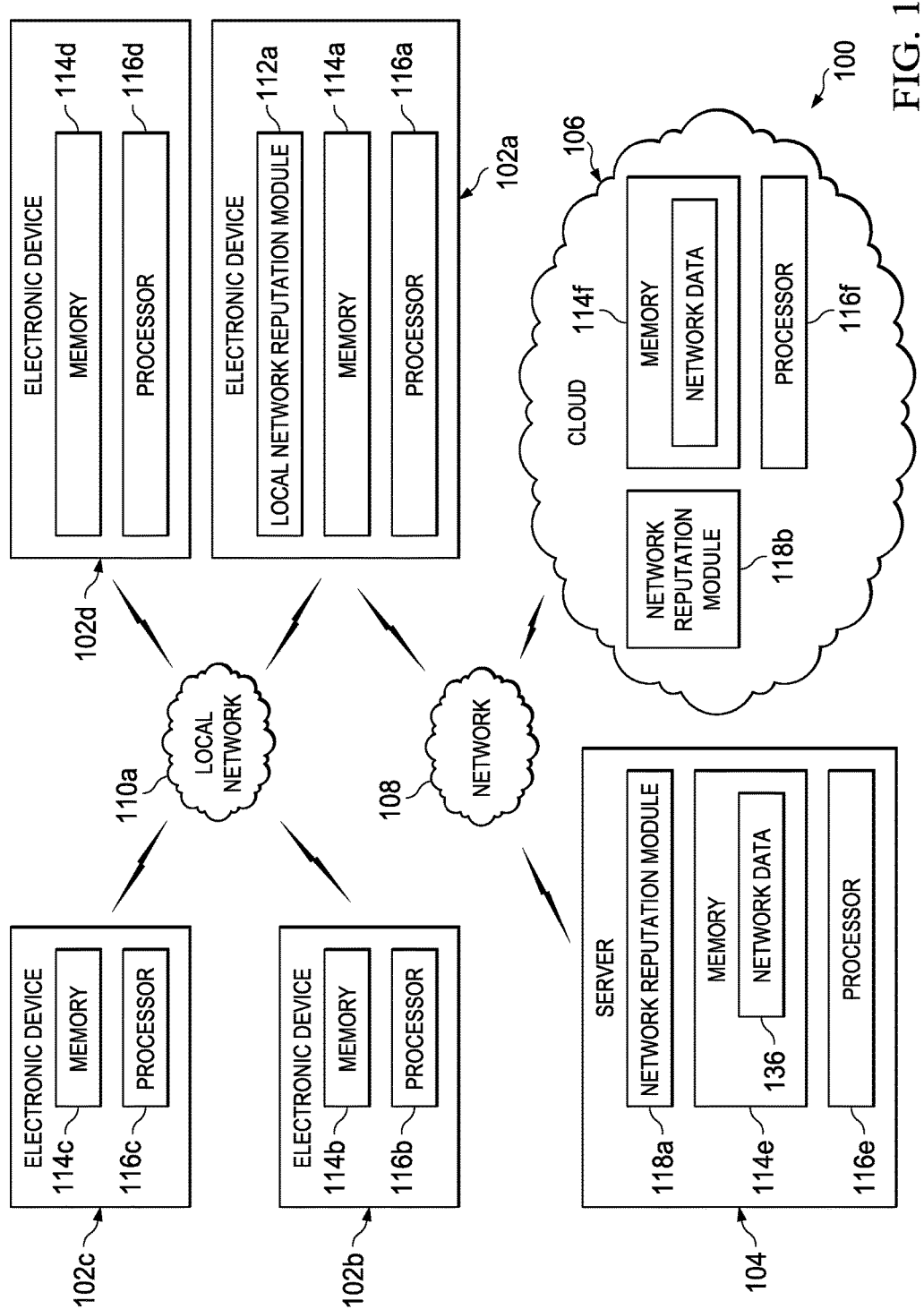
FIG. 1 is a simplified block diagram of a communication system to combine multiple reputations in accordance with an embodiment of the present disclosure.

FIG. 1 is a simplified block diagram of a communication system 100 to combine multiple reputations in accordance with an embodiment of the present disclosure. As illustrated in FIG. 1, an embodiment of communication system 100 can include electronic devices 102a-102d, a server 104, and a cloud 106. Electronic device 102a can include a local network reputation module 112a. Each electronic device 102a-102d can include memory 114a-d respectively and a processor 116a-d respectively. Server 104 can include memory 114e, a processor 116e, and a network reputation module 118a. Memory 114e can include network data 136. Cloud 106 can include memory 114f, a processor 116f, and a network reputation module 118b. Electronic device 102a, server 104, and cloud 106 may be in communication using network 108. Electronic devices 102a-102d may be in communication using local network 110a.

In example embodiments, communication system 100 can be configured to combine multiple reputations in accordance with an embodiment of the present disclosure. Local network reputation module 112a can be configured to acquire a plurality of reputations related to an object and combine the plurality of reputations to create a total reputation for the object. The object can include a plurality of sub-objects and each of the plurality of reputations can correspond to one of the sub-objects. In an example, a Bayesian algorithm may be used to combine the multiple reputations.

Elements of FIG. 1 may be coupled to one another through one or more interfaces employing any suitable connections (wired or wireless), which provide viable pathways for network (e.g., network 108, local network 110a, etc.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Currently, the various concepts around device and network reputations can generate a reputation for an object or generate a finding that can be converted into a reputation. However, existing solutions primarily rely on determining the reputation using updatable content and do not allow for an efficient system to combine multiple reputations. The existing solutions require frequent updates to content in order to determine a reputation. This can be expensive to sustain, virtually impossible for end user reputations, and cannot meet the target functionality for customer reputation sources. What is needed is the ability to determine a reputation and include arbitrary end user generated reputations not visible on the backend.

A communication system for combining multiple reputations, as outlined in FIG. 1, can resolve these issues (and others). Communication system 100 may be configured to use probabilistic math with an external weight and confidence normalizing values to achieve a final reputation. A series of flags may be used to identify appropriate remediation for the final reputation. A reputation can be mapped to a trust score (0-100) and may include a series of attributes associated with that reputation. For example, a reputation can include, a backend reputation, a service provider reputation, and an external reputation.

Backend reputations can include reputations that are provided by the backend of the system (e.g., server 104 and cloud 106). The backend reputations can include, but are not limited to, a server enterprise reputation, global threat reputations for file, cert, URL reputations, anti-virus scan engine reputations, zero-day reputations, etc.

Service provider reputations can include reputations that are provided in content from the service provider. The service provider reputations could come from any scanner or module which provides reputation related data, such as Raptor, JTI rules, anti-virus engine, DATs, host intrusion prevention system rules, etc.

External reputations are reputations which are defined by end users or systems used by end users and not provided by the backend. External reputations may be referred to as end user or customer reputations. When an end user or an electronic device associated with an end user creates a custom reputation type, the custom reputation type will need at minimum a trust score and the trust score can be calculated by code. For example, external anti-virus and parsing detection can be used to determine threshold level reputations as an output (e.g., known malicious for confirmed detections, most likely malicious for heuristics, etc.). Also, the trust score can be, at least partially, determined as part of an import scheme (e.g., all hashes imported from a specific feed could be considered most likely malicious).

The following is example of data that may be used to allow a reputation to be interpreted by a generic rule. A trust score can be a numeric value 0-100 and is the reputation score. A reputation confidence can be a numeric value 00.0-1.0 and represents how much a particular reputation is trusted. Reputation weight can be a numeric value 0.0-1.0 and represents how important the reputation is to the final results.

An external customer reputation can be many different things and can include firewall, OPENIOC sources, third party anti-virus scanners, etc. For external reputations, especially those from machine learning, the weight and confidence values could be determined by considering not only the confidence that the model produces the correct classification in context, but also the attributes source reputation. Note that a model may produce a different reputation confidence each time it is rebuilt. Thus, the reputation confidence may change over time for a given source. For instance, if a particular machine learning model uses attributes from multiple reputation sources, the confidence and weight could be an average of the individual confidence and weight values from the reputations which source the attributes.

Regarding the end user, or end user electronic device, a generic rule is required to interpret the various reputations provided by the electronic device, the server or cloud, as well as local scanners. A Bayesian algorithm approach with flags to control when a repair is applied may be used to interpret the various reputations. Bayesian math works very efficiently to combine multiple independent classifiers (in this case reputations) to determine a final class and probability of a class. In an example, reputations can range from 0-100 for the explicit purpose of being able to be used in probabilistic math. Note that one can convert any arbitrary scale to the 0-100 scale easily enough and a 0-199 scale can produce superior results to a weight based algorithm almost all the time. The Bayesian algorithm is only used as an illustrative example and other algorithms may be used and are within the scope of this disclosure.

In a specific example, an initial probability of maliciousness can be defined as Pim=0.2 (note that the probability of maliciousness can be defined as any number and for this example, is defined as a number between 0.0 and 1.0). The initial probability of trusted can be defined as Pit=0.8 (note that the initial probability of trust can be defined as any number and for this example, is defined as a number between 0.0 and 1.0). For each reputation (e.g., backend reputation, service provider reputation, external reputation, etc.), a reputation trust score can be defined as R, the confidence as C, and the weight a W. The probability of maliciousness can be calculated as (Pm)=((100−(R*C*W))/100). The probability of trusted can be calculated as (Pt)=(R/100)*C*W. The new initial probability of maliciousness will be (Pim*Pm)/((Pim*Pm)+(Pit*Pt)). The new initial probability of trusted will be (Pit*Pt)/((Pim*Pm)+(Pit*Pt))

In another example, if a system has a global threat file reputation of 70 and a confidence of 1.0, then Pm=0.3 (1.0−0.7) and Pt=0.7 (1.0×0.7). Given the initial probabilities, the final probabilities are Pim=0.0967 and Pit=0.9032. This means that there is roughly a 90% chance that the file can be trusted. The final local reputation (Rl) value can be mapped from the probabilities back to the reputation ranges as follows: if Pic is greater than Pit then Rl is set to 100; if Pic is not greater than Pit, then Rl is set equal to Pit*100 (i.e., if Pic>Pit then 100; else Pit*100). While the initial probability values of 0.2 and 0.8 are used in the above examples, any rational number between 0.00 and 1.00 can be selected. Likewise, the reputation confidence and weight could exceed 1.00, although should not be less than 0.00.

Flags can be set for an object, file, or data and determine if general remediation or repair to the object, file, or data is allowed (e.g., NO_FLAGS=0, ALLOW_REPAIR=1, DISALLOW_REPAIR=2, DISALLOW_BLOCK=3, etc.). For example, if an allow repair flag is set, then general remediation will be allowed if the external reputation agrees with the final reputation score. More specifically, if the final result is malicious and the policy allows general remediation for that reputation level and the reputation is also malicious, then general remediation will be allowed. If a disallow repair flag is set, then a general remediation would be prevented if the external reputation agrees with the final result and blocking may occur. If a disallow block flag is set, then a block would be prevented or not allowed if the external reputation agrees with the final result. If a block is triggered but the disallow block flag is sent, then a prompt action or an alert could be issued. In a specific example, where the object for which a reputation is being calculated is a file or is a process, general remediation such as removing the file from memory or terminating the process can be determined using flags.

Repair is determined for each reputation. If R<Unknown&&RI<Unknown then the flags of that reputation are applied to the final repair status and determined by comparing the flags of the reputation (R) with the final local reputation (RI). After each reputation has been examined, if the final repair status has the DISALLOW_REPAIR flag set, repair will be explicitly denied. Otherwise if it has the ALLOW_REPAIR flag set, repair will be enabled. The DISALLOW_BLOCK flag will prevent blocking and implicitly repair. If no flag is set, then repair will not occur. The above values used for the flags are merely illustrative examples and other similar examples could be used.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Local network 110a represents a series of points or nodes of interconnected communication paths for receiving and transmitting packets of information that propagate through electronic devices 102a-102d. Local network 110a offers a communicative interface between nodes, and may be configured as any local area network (LAN), virtual local area network (VLAN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-d, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a-d, server 104, and cloud 106 can include memory elements (e.g., memory 114a-114f) for storing information to be used in the operations outlined herein. Each of electronic devices 102a-d, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element. Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a-d, server 104, and cloud 106 may include software modules (e.g., local network reputation module 112a and network reputation module 118a and 118b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-d, server 104, and cloud 106 may include a processor (e.g., processor 116a-116f) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a-d can each be a network element and includes, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication systems 100a and 100b via some network (e.g., network 108). The term 'server' is inclusive of devices used to serve the requests of clients and/or perform some computational task on behalf of clients within communication system 100. Although local network reputation module 112a is represented in FIG. 1 as being located in electronic device 102a, this is for illustrative purposes only. Local network reputation module 112a could be combined or separated in any suitable configuration. Furthermore, local network reputation module 112a could be integrated with or distributed in another network accessible by electronic devices 102a-d such as server 104 or cloud 106. Cloud 106 is configured to provide cloud services to electronic devices 102a-d. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
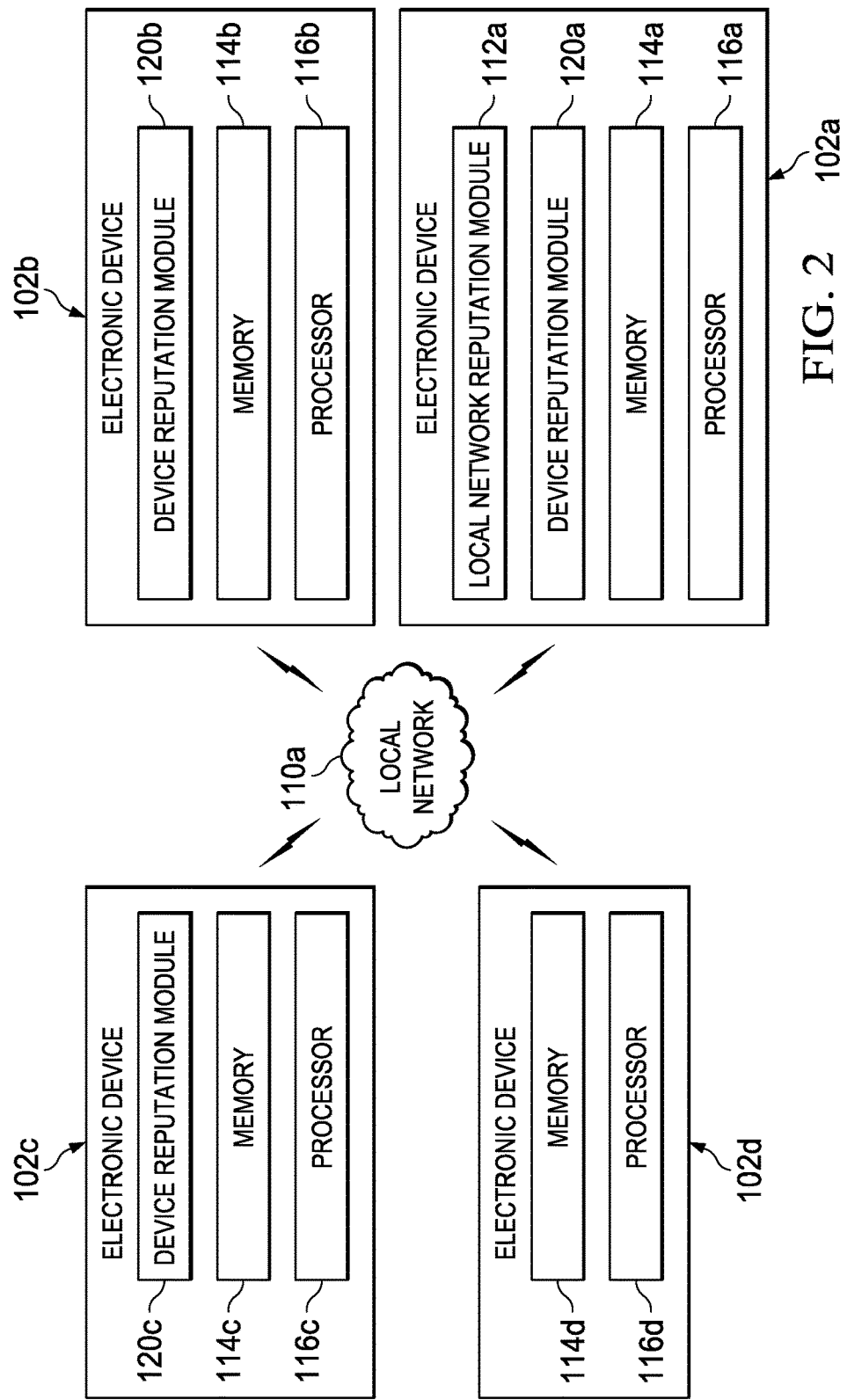
FIG. 2 is a simplified block diagram of example details of a communication system to combine multiple reputations in accordance with an embodiment of the present disclosure.

Turning to FIG. 2, FIG. 2 is a simplified block diagram of a portion of a communication system 100 to combine multiple reputations in accordance with an embodiment of the present disclosure. As illustrated in FIG. 2, each electronic device 102a-102c can include a device reputation module 120a-120c respectively. Device reputation modules 120a-120c can be configured to determine a reputation for the device where the device reputation module is located. For example, device reputation module 120a can be configured to determine the reputation for electronic device 102a, device reputation module 120b can be configured to determine the reputation for electronic device 102b, and device reputation module 120c can be configured to determine the reputation for electronic device 102c. Electronic device 102d is illustrated as not including a reputation module and the system can be configured to include a plurality of electronic devices that do not include a reputation data module. In such an example, local network reputation module 112a can be configured to determine the reputation for electronic device 102d using data or information related to electronic device 102d. For example, local network reputation module 112a may determine the reputation of electronic device by using the data that flows to and from electronic device 102d, the connections to and from electronic device 102d, the type of electronic device 102d, etc. Each device reputation module 120a-120c can be configured to communicate the determined reputation to local network reputation module 112a where a reputation of electronic devices 102a-102d as a group can be determined.

Figure 3:
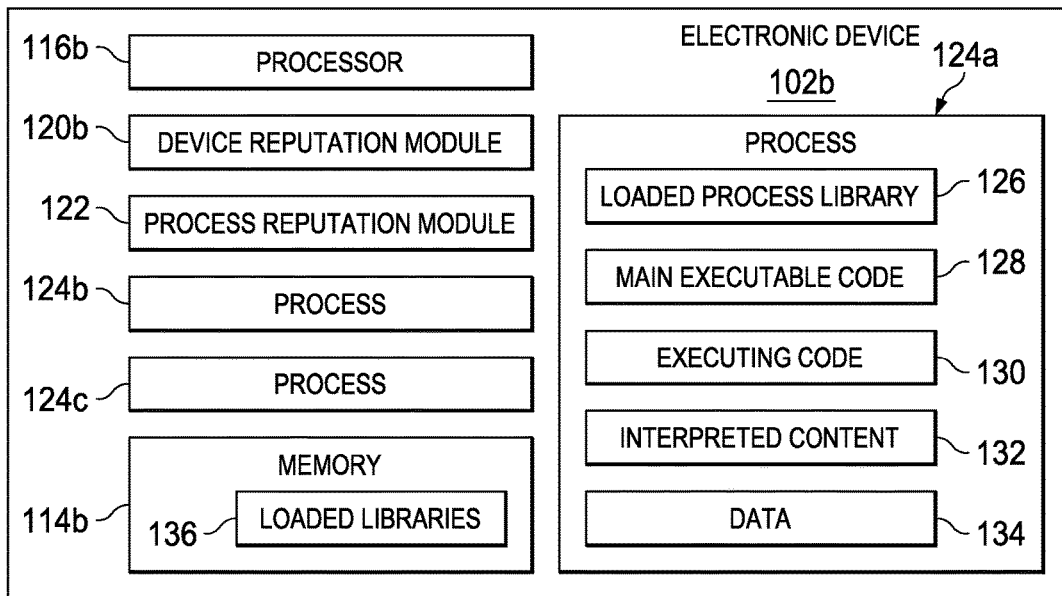
FIG. 3 is a simplified block diagram of example details of a portion of a communication system to combine multiple reputations in accordance with an embodiment of the present disclosure.

Turning to FIG. 3, FIG. 3 is a simplified block diagram of a portion of a communication system 300 to combine multiple reputations in accordance with an embodiment of the present disclosure. As illustrated in FIG. 3, electronic device 102b can include memory 114b, processor 116b, device reputation module 120b, process reputation module 122, and one or more process 124a-124c. Memory 116b can include loaded libraries 136. Process 124a can include loaded process library 126, main executable code 128, executing code 130, interpreted content 132, and data 134. Each process 124b and 124c can include the same or similar elements as illustrated in process 124a. Similarly, each of the other electronic devices 102a, 102c, and 102d can include the same or similar elements as illustrated in electronic device 102b in FIG. 3.

Process reputation module 122 can be configured to determine a reputation for each process 124a-124c. For example, process reputation module 122 can determine or receive a reputation for loaded process library 126, main executable code 128, executing code 130, interpreted content 132, and data 134 and combine those reputations into a reputation for process 124a. Loaded process library 126, main executable code 128, executing code 130, interpreted content 132, and data 134 are provided as an illustrative example only and any combination may be used to determine a reputation for process 124a or other examples may be used to determine a reputation for process 124a. Also, process reputation module 122 can use a similar means of determining a reputation for processes 124b and 124c. Device reputation module 120b can be configured to determine a reputation for electronic device 102b by combining the reputation of each process 124a-124c as well as other reputations related to electronic device 102b.

Figure 4:
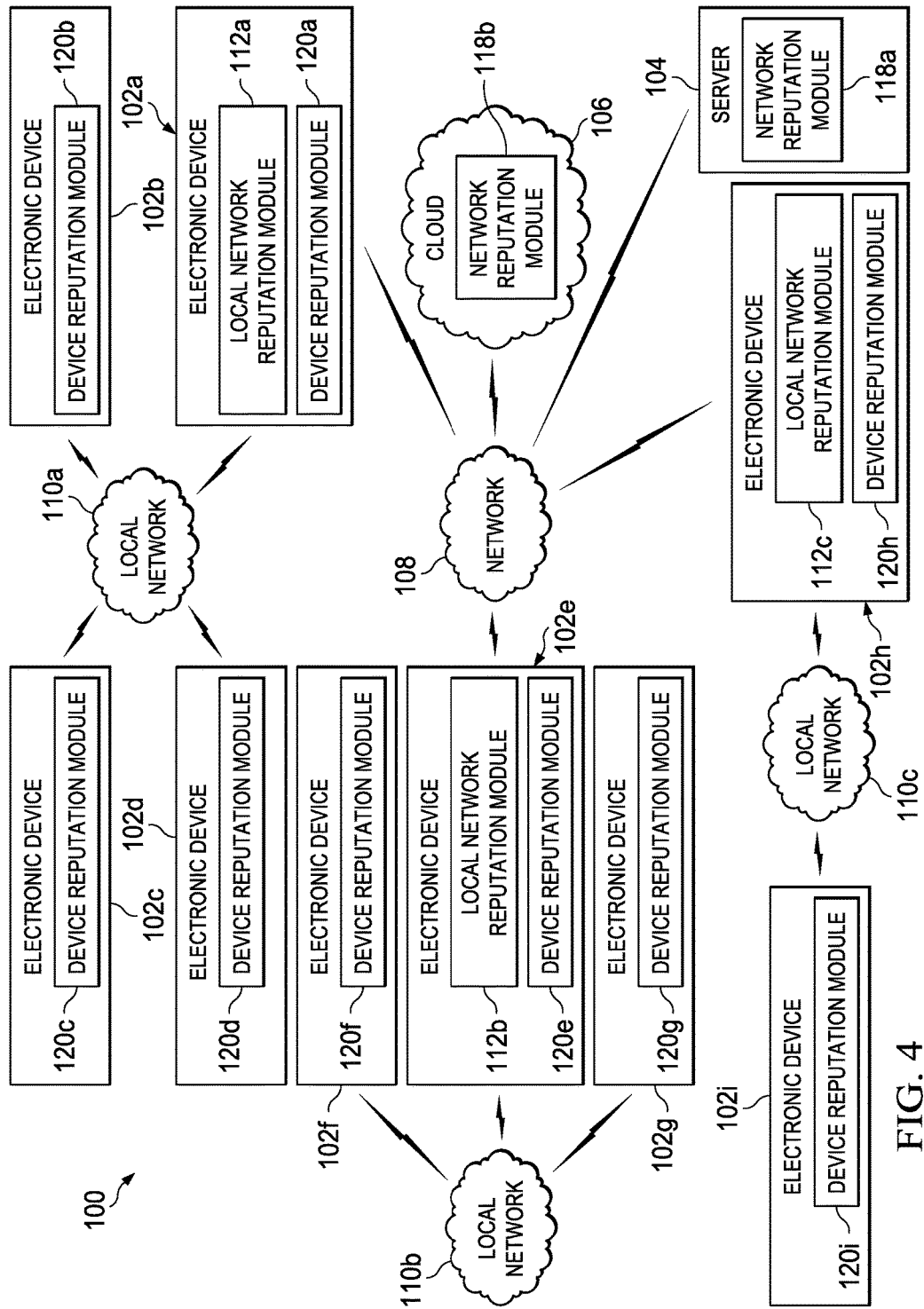
FIG. 4 is a simplified block diagram of example details of a communication system to combine multiple reputations in accordance with an embodiment of the present disclosure.

Turning to FIG. 4, FIG. 4 is a simplified block diagram of communication system 100 to combine multiple reputations in accordance with an embodiment of the present disclosure. As illustrated in FIG. 4, communication system can include electronic devices 102a-102i. Electronic device 102a-102d may be grouped or linked together through local network 110a. Electronic devices 102e-102g may be grouped or linked together through a local network 110b. Electronic devices 102h and 102i may be grouped or linked together through a local network 110c. Each electronic device 102a-102i can include a device reputation module 120a-120i respectively. As discuss above with reference to electronic device 102b in FIG. 3, device reputation module 120b can be configured to determine a reputation for electronic device 102b. Similarly, each device reputation module 120a and 120c-120i can be configured to determine a reputation for electronic device 102a and 120c-120i respectively. Further, as discussed above, local network reputation module 112a can be configured to determine a reputation for electronic devices 102a-102d as a group. Electronic device 102e can include a local network reputation module 112b and local network reputation module 112b can be configured to determine a reputation for electronic devices 102e-102g as a group. Also, electronic device 102h can include a local network reputation modules 112c and local network reputation module 112c can be configured to determine a reputation for electronic devices 102h and 102i as a group. Local network reputation modules 112a-112c can communicate the determined reputation for their respective group to network reputation module 118a and 118b. Network reputation modules 118a and 118b can be configured to use the reputations communicated from local network reputation modules 112a-112c and determine a reputation for communication system 100.

Figure 5:
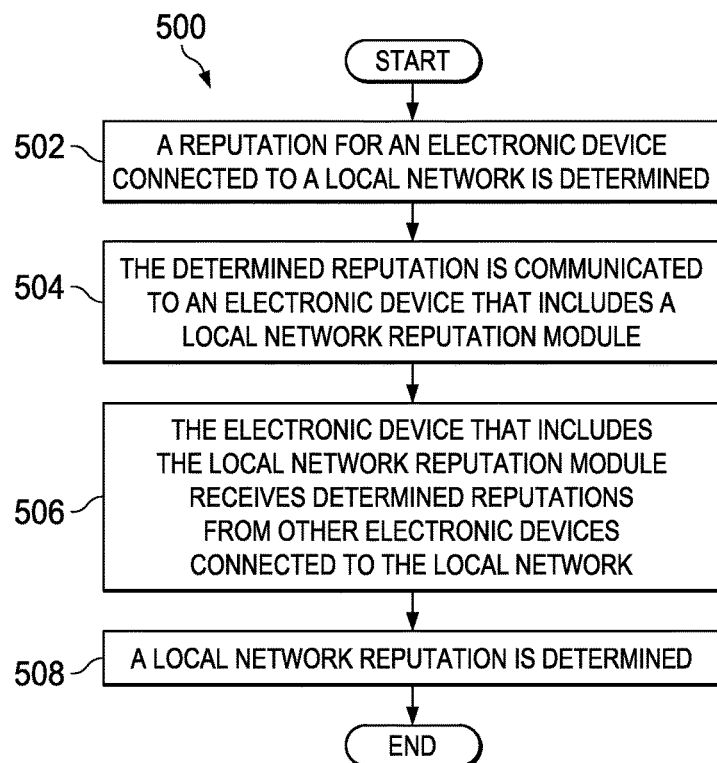
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with combining multiple reputations, in accordance with an embodiment. In an embodiment, one or more operations of flow 500 may be performed by local network reputation modules 112a-112c, network reputation module 118a and 118b, and device reputation module 120a-i. At 502, a reputation for an electronic device connected to a local network is determined. At 504, the determined reputation is communicated to an electronic device that includes a local network reputation module. At 506, the electronic device that includes the local network reputation module receives determined reputations from other electronic devices connected to the local network. At 508, a local network reputation is determined.

Figure 6:
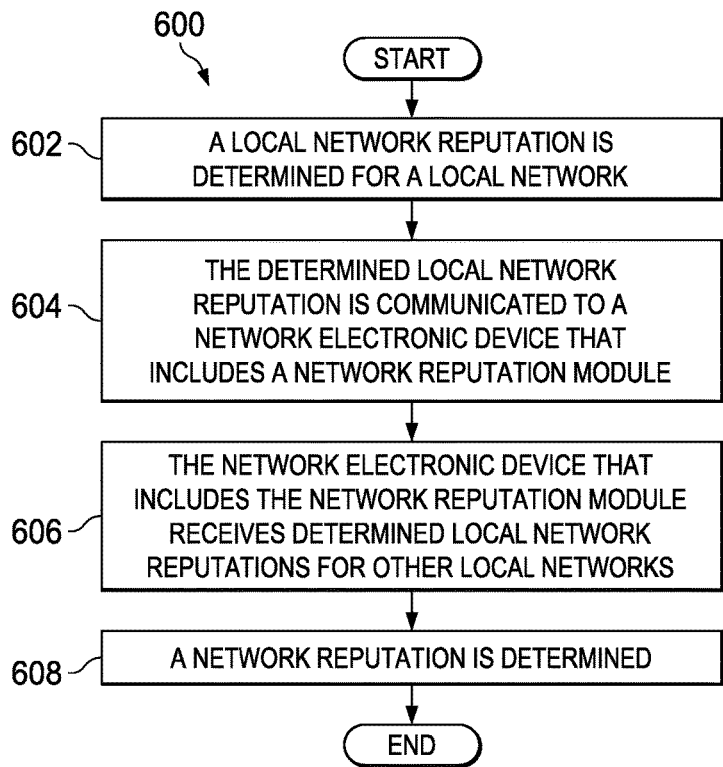
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with combining multiple reputations, in accordance with an embodiment. In an embodiment, one or more operations of flow 600 may be performed by local network reputation modules 112a-112c, network reputation module 118a and 118b, and device reputation module 120a-i. At 602, a local reputation is determined for a local network. At 604, the determined local network reputation is communicated to a network electronic device that includes a network reputation module. At 606, the network electronic device that includes the network reputation module receives determined local network reputations from other local networks. At 608, a network reputation is determined.

Figure 7:
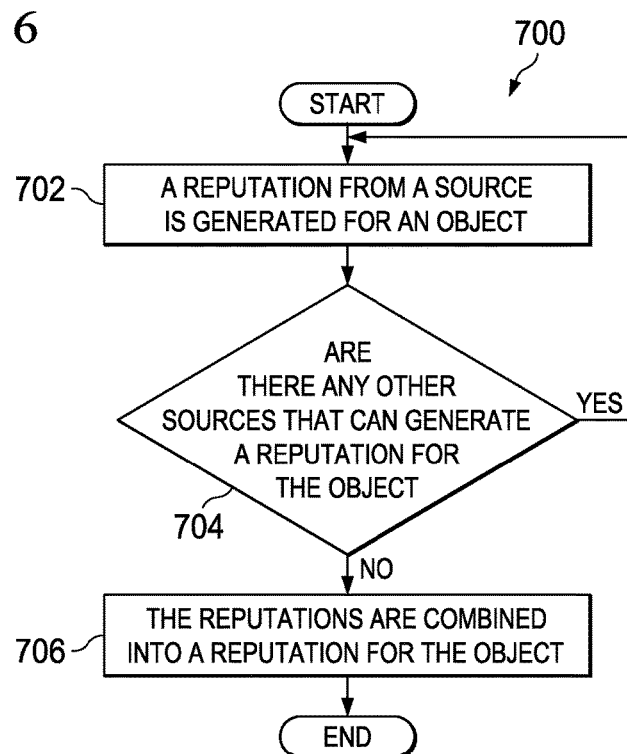
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with combining multiple reputations, in accordance with an embodiment. In an embodiment, one or more operations of flow 700 may be performed by local network reputation modules 112a-112c, network reputation module 118a and 118b, and device reputation module 120a-i. At 702, a reputation from a source is generated for an object. At 704, the system determines if there are any other sources that can generate a reputation for the object. If there are any other sources that can generate a reputation for the object, then a reputation from the source (i.e., the other source) is generated for the object, as in 702. If there are not any other sources than can generate a reputation for the object, then the reputations are combined into a reputation for the object, as in 706. Using this process, a reputation for an object can be created or determined using multiple sources.

Figure 8:
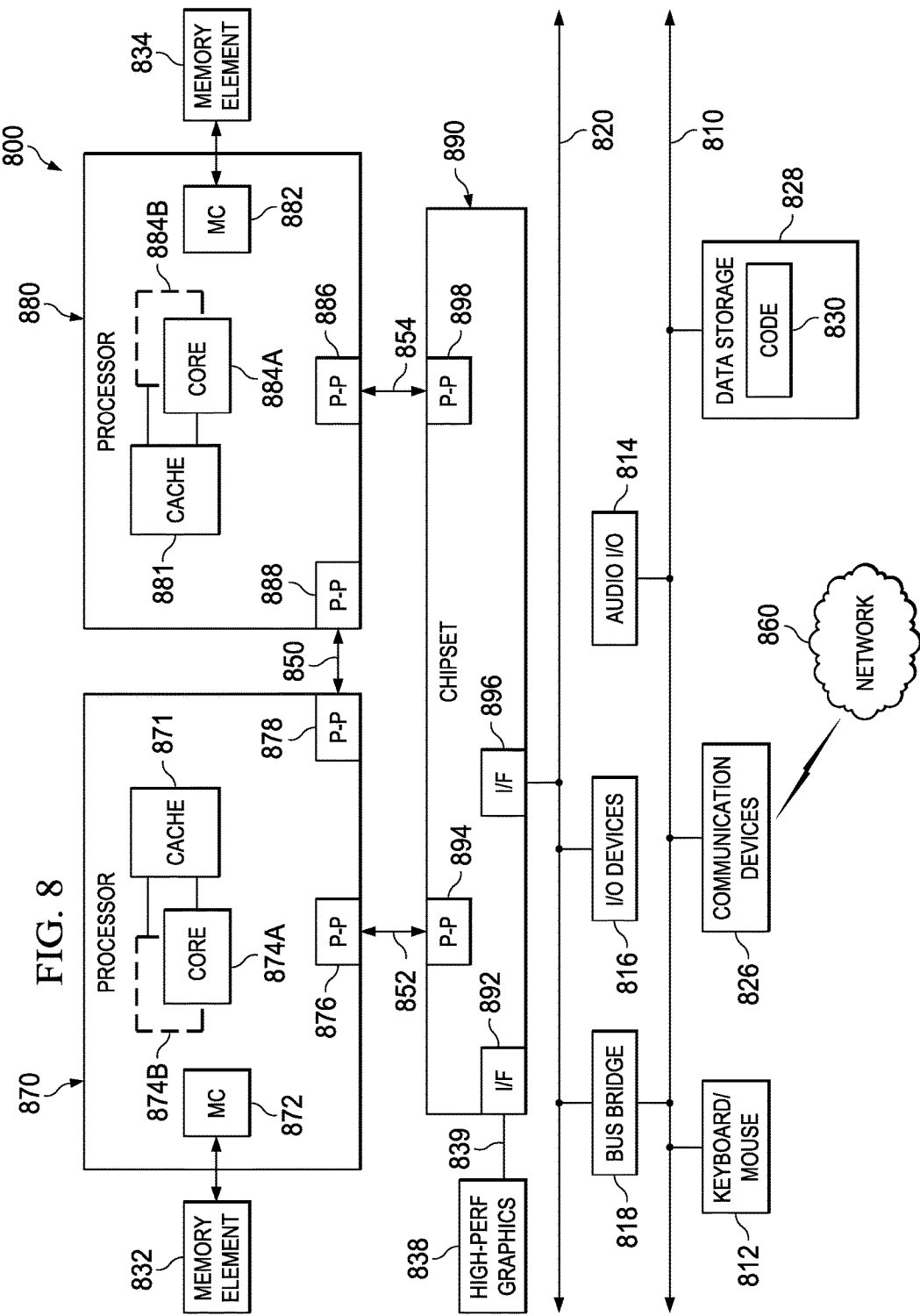
FIG. 8 is a block diagram illustrating an example computing system that is arranged in a point-to-point configuration in accordance with an embodiment.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements of communication system 10 may be configured in the same or similar manner as computing system 800.

As illustrated in FIG. 8, system 800 may include several processors, of which only two, processors 870 and 880, are shown for clarity. While two processors 870 and 880 are shown, it is to be understood that an embodiment of system 800 may also include only one such processor. Processors 870 and 880 may each include a set of cores (i.e., processor cores 874A and 874B and processor cores 884A and 884B) to execute multiple threads of a program. The cores may be configured to execute instruction code in a manner similar to that discussed above with reference to FIGS. 1-7. Each processor 870, 880 may include at least one shared cache 871, 881. Shared caches 871, 881 may store data (e.g., instructions) that are utilized by one or more components of processors 870, 880, such as processor cores 874 and 884.

Processors 870 and 880 may also each include integrated memory controller logic (MC) 872 and 882 to communicate with memory elements 832 and 834. Memory elements 832 and/or 834 may store various data used by processors 870 and 880. In alternative embodiments, memory controller logic 872 and 882 may be discrete logic separate from processors 870 and 880.

Processors 870 and 880 may be any type of processor and may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 9:
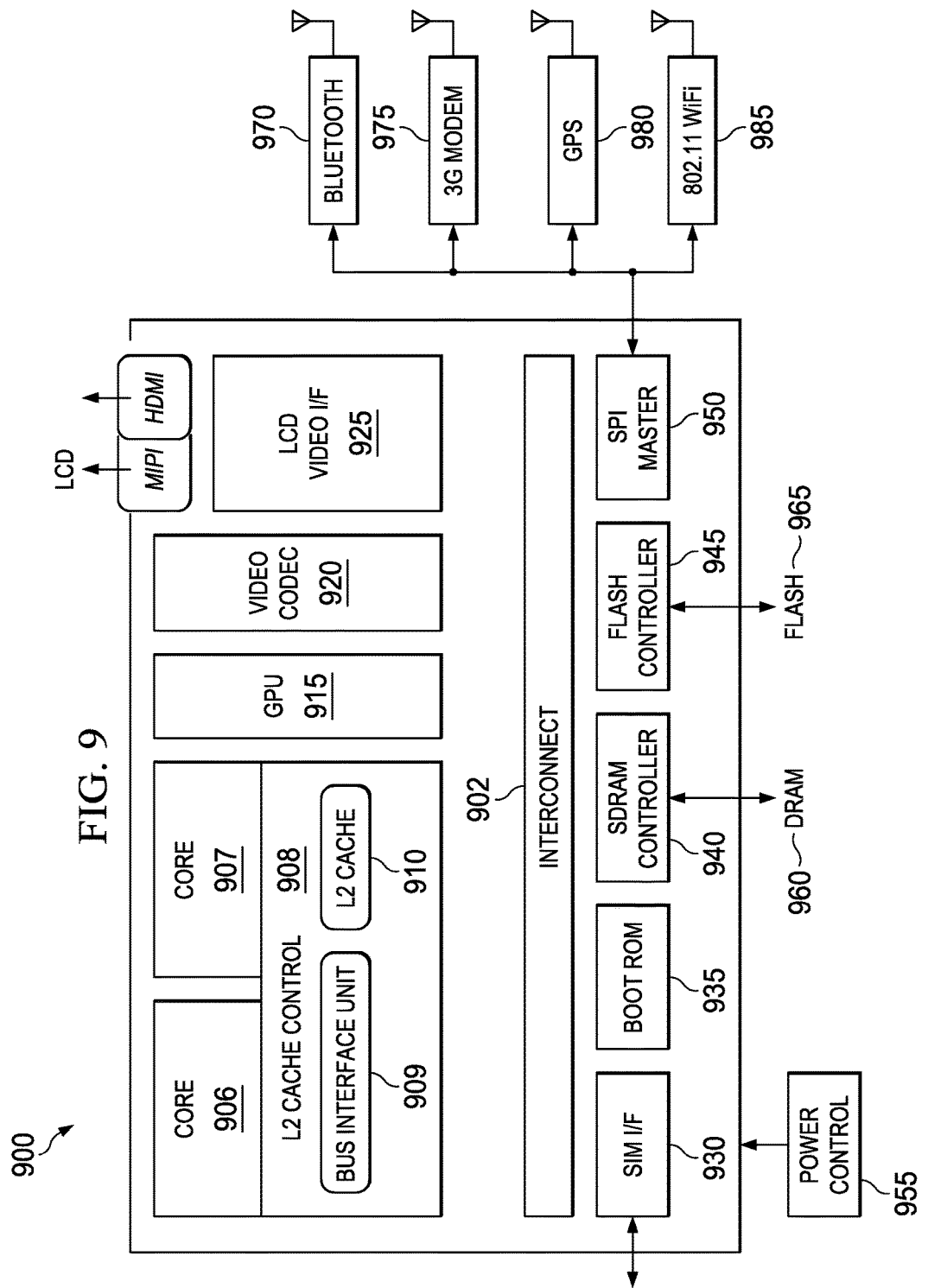
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the combination of multiple reputations features discussed herein and an ARM component. For example, the example of FIG. 9 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more example embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 10:
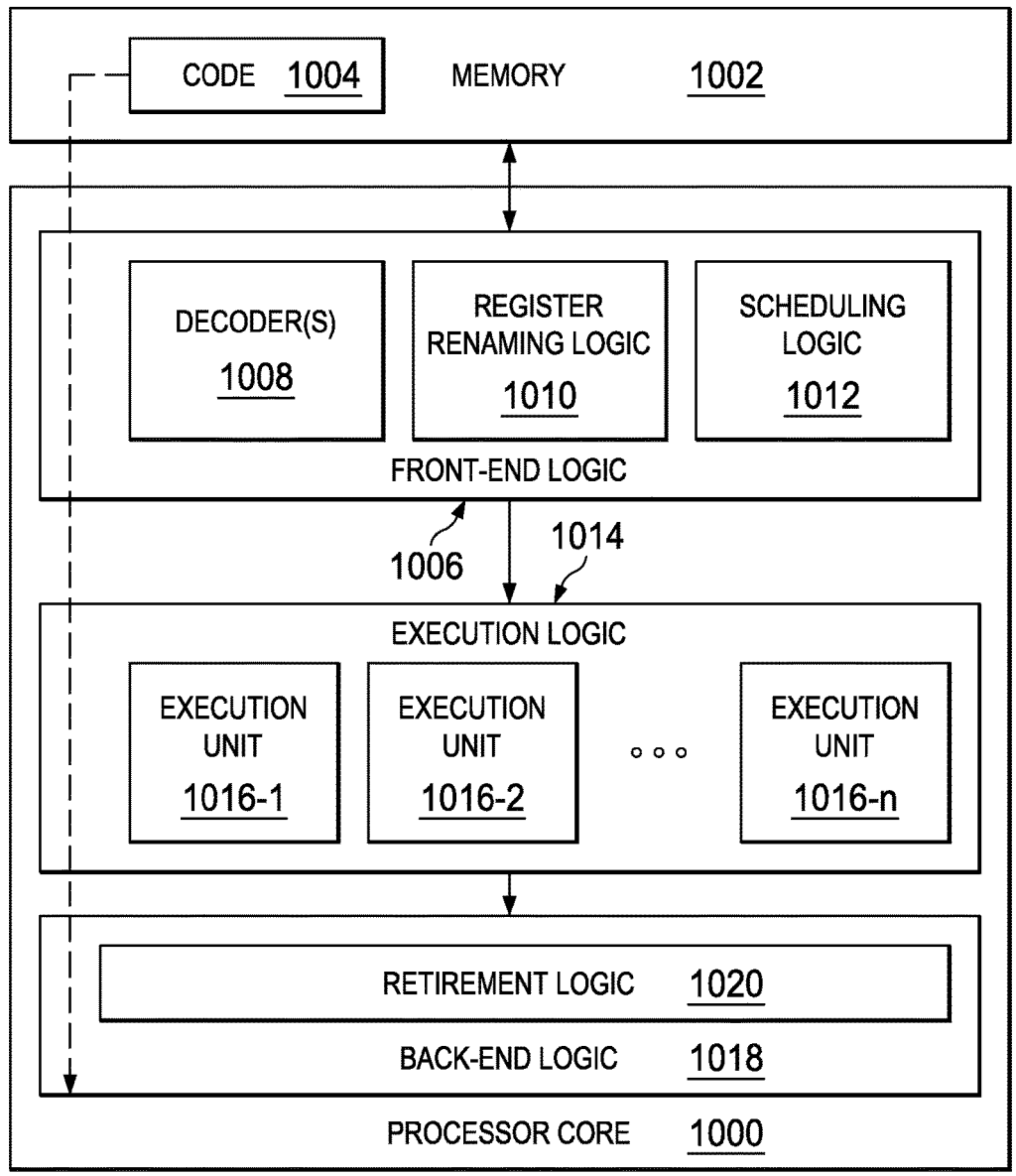
FIG. 10 is a block diagram illustrating an example processor core in accordance with an embodiment.

FIG. 10 illustrates a processor core 1000 according to an embodiment. Processor core 1000 may be the core for any type of processor, such as a micro-processor, an embedded processor, a digital signal processor (DSP), a network processor, or other device to execute code. Although only one processor core 1000 is illustrated in FIG. 10, a processor may alternatively include more than one of the processor core 1000 illustrated in FIG. 10. For example, processor core 1000 represents one example embodiment of processors cores 874*a*, 874*b*, 884*a*, and 884*b* shown and described with reference to processors 870 and 880 of FIG. 8. Processor core 1000 may be a single-threaded core or, for at least one embodiment, processor core 1000 may be multithreaded in that it may include more than one hardware thread context (or "logical processor") per core.

FIG. 10 also illustrates a memory 1002 coupled to processor core 1000 in accordance with an embodiment. Memory 1002 may be any of a wide variety of memories (including various layers of memory hierarchy) as are known or otherwise available to those of skill in the art. Memory 1002 may include code 1004, which may be one or more instructions, to be executed by processor core 1000. Processor core 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor core 1000 can also include execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor core 1000 allows out of order execution but requires in order retirement of instructions. Retirement logic 1020 may take a variety of known forms (e.g., re-order buffers or the like). In this manner, processor core 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processor may include other elements on a chip with processor core 1000, at least some of which were shown and described herein with reference to FIG. 8. For example, as shown in FIG. 8, a processor may include memory control logic along with processor core 1000. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 3-7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to acquire a plurality of reputations related to an object, where the object includes a plurality of sub-objects and each of the plurality of reputations corresponds to one of the plurality of sub-objects, and combine the plurality of reputations to create a total reputation for the object.

In Example C2, the subject matter of Example C1 can optionally include where the object is an electronic device and the sub-objects are processes running on the electronic device and each of the plurality of reputations is a reputation related to one of the processes.

In Example C3, the subject matter of any one of Examples C1-C2 can optionally include where a Bayesian algorithm is used to combine the plurality of reputations.

In Example C4, the subject matter of any one of Examples C1-C3 can optionally include where each of the plurality of reputations includes a reputation confidence and a reputation weight.

In Example C5, the subject matter of any one of Examples C1-C4 can optionally include where the one or more instructions that when executed by the at least one processor, further cause the processor to allow general remediation for a malicious reputation when an allow repair flag is set for a sub-object related to the malicious reputation.

In Example C6, the subject matter of any one of Example C1-C5 can optionally include where at least one of the plurality of reputations for a sub-object was determined by combining multiple reputations for the sub-object.

In Example C7, the subject matter of any one of Examples C1-C6 can optionally include where the object is an electronic device and the total reputation for the object is communicated to a second electronic device.

In Example C8, the subject matter of any one of Examples C1-C7 can optionally include where the one or more instructions that when executed by the at least one processor, further cause the processor to acquire, at the second electronic device, a plurality of reputations related to a plurality of objects connected to a network, where the object is included in the plurality of objects, and combine the plurality of reputations to create a total reputation for the network.

In Example A1, an electronic device can include a reputation module, where the reputation module is configured to acquire a plurality of reputations related to an object, where the object includes a plurality of sub-objects and each of the plurality of reputations corresponds to one of the plurality of sub-objects, and combine the plurality of reputations to create a total reputation for the object.

In Example, A2, the subject matter of Example A1 can optionally include where the object is an electronic device and the sub-objects are processes running on the electronic device and each of the plurality of reputations is a reputation related to one of the processes.

In Example A3, the subject matter of any one of Examples A1-A2 can optionally include where a Bayesian algorithm is used to combine the plurality of reputations.

In Example A4, the subject matter of any one of Examples A1-A3 can optionally include where each of the plurality of reputations includes a reputation confidence and a reputation weight.

In Example A5, the subject matter of any one of Examples A1-A4 can optionally include where the reputation module is further configured to allow general remediation for a malicious reputation when an allow repair flag is set for a sub-object related to the malicious reputation.

In Example A6, the subject matter of any one of Examples A1-A5 can optionally include where at least one of the plurality of reputations for a sub-object was determined by combining multiple reputations for the sub-object.

In Example A7, the subject matter of any one of Examples A1-A6 can optionally include where the object is an electronic device and the total reputation for the object is communicated to a second electronic device.

In Example A8, the subject matter of any one of Examples A1-A7 can optionally include where the reputation module is further configured to acquire, at the second electronic device, a plurality of reputations related to a plurality of objects connected to a network, where the object is included in the plurality of objects, and combine the plurality of reputations to create a total reputation for the network.

Example M1 is a method including acquiring a plurality of reputations related to an object, where the object includes a plurality of sub-objects and each of the plurality of reputations corresponds to one of the plurality of sub-objects, and combining the plurality of reputations to create a total reputation for the object.

In Example M2, the subject matter of Example M1 can optionally include where the object is an electronic device and the sub-objects are processes running on the electronic device and each of the plurality of reputations is a reputation related to one of the processes.

In Example M3, the subject matter of any one of the Examples M1-M2 can optionally include where a Bayesian algorithm is used to combine the plurality of reputations.

In Example M4, the subject matter of any one of the Examples M1-M3 can optionally include where each of the plurality of reputations includes a reputation confidence and a reputation weight.

In Example M5, the subject matter of any one of the Examples M1-M4 can optionally include where at least one of the plurality of reputations for a sub-object was determined by combining multiple reputations for the sub-object.

In Example M6, the subject matter of any one of the Examples M1-M5 can optionally include where the object is an electronic device and the total reputation for the object is communicated to a second electronic device.

In Example M7, the subject matter of any one of the Examples M1-M6 can optionally include acquiring, at the second electronic device, a plurality of reputations related to a plurality of objects connected to a network, where the object is included in the plurality of objects, and combining the plurality of reputations to create a total reputation for the network.

Example S1 is a system for combining multiple reputations, the system including a reputation module configured for acquiring a plurality of reputations related to an object, where the object includes a plurality of sub-objects and each of the plurality of reputations corresponds to one of the plurality of sub-objects, and combining the plurality of reputations to create a total reputation for the object.

In Example S2, the subject matter of Example S1 can optionally include where a Bayesian algorithm is used to combine the plurality of reputations.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the at least one processor to:
   acquire a plurality of reputations related to an object, wherein the plurality of reputations includes at least one backend reputation, at least one service provider reputation, and at least one external reputation, wherein the object includes a plurality of sub-objects and each of the plurality of reputations corresponds to one of the plurality of sub-objects, and wherein the object is an electronic device and the sub-objects are processes running on the electronic device and each of the plurality of reputations is a reputation related to one of the processes;
   determine whether any other source can generate a reputation for the object;
   combine the plurality of reputations and the reputation generated by the any other source to create a total reputation for the object, wherein each of the plurality of reputations includes a reputation confidence and a reputation weight; and
   determine whether the object can be trusted based on the total reputation.

2. The at least one non-transitory computer-readable medium of claim 1, wherein a Bayesian algorithm is used to combine the plurality of reputations.

3. The at least one non-transitory computer-readable medium of claim 1, further comprising one or more instructions that when executed by the at least one processor, further cause the at least one processor to:
   allow general remediation for a malicious reputation when an allow repair flag is set for a sub-object related to the malicious reputation.

4. The at least one non-transitory computer-readable medium of claim 1, wherein at least one of the plurality of reputations for a sub-object was determined by combining multiple reputations for the sub-object.

5. The at least one non-transitory computer-readable medium of claim 1, wherein the total reputation for the object is communicated to a second electronic device.

6. The at least one non-transitory computer-readable medium of claim 5, further comprising one or more instructions that when executed by the at least one processor, further cause the at least one processor to:
   acquire, at the second electronic device, a plurality of reputations related to a plurality of objects connected to a network, wherein the object is included in the plurality of objects; and
   combine the plurality of reputations to create a total reputation for the network.

7. An apparatus comprising:
   memory;
   a hardware processor; and
   a reputation module configured to:
      acquire a plurality of reputations related to an object, wherein the plurality of reputations includes at least one backend reputation, at least one service provider reputation, and at least one external reputation, wherein the object includes a plurality of sub-objects and each of the plurality of reputations corresponds to one of the plurality of sub-objects, and wherein the object is an electronic device and the sub-objects are processes running on the electronic device and each of the plurality of reputations is a reputation related to one of the processes;
      determine whether any other source can generate a reputation for the object;
      combine the plurality of reputations and the reputation generated by the any other source to create a total reputation for the object, wherein each of the plurality of reputations includes a reputation confidence and a reputation weight; and
      determine whether the object can be trusted based on the total reputation.

8. The apparatus of claim 7, wherein a Bayesian algorithm is used to combine the plurality of reputations.

9. The apparatus of claim 7, wherein the reputation module is further configured to:
   allow general remediation for a malicious reputation when an allow repair flag is set for a sub-object related to the malicious reputation.

10. The apparatus of claim 7, wherein at least one of the plurality of reputations for a sub-object was determined by combining multiple reputations for the sub-object.

11. The apparatus of claim 7, wherein the total reputation for the object is communicated to a second electronic device.

12. The apparatus of claim 11, wherein reputation module configured to:
    acquire, at the second electronic device, a plurality of reputations related to a plurality of objects connected to a network, wherein the object is included in the plurality of objects; and
    combine the plurality of reputations to create a total reputation for the network.

13. A method comprising:
    acquiring a plurality of reputations related to an object, wherein the plurality of reputations includes at least one backend reputation, at least one service provider reputation, and at least one external reputation, wherein the object includes a plurality of sub-objects and each of the plurality of reputations corresponds to one of the plurality of sub-objects, and wherein the object is an electronic device and the sub-objects are processes running on the electronic device and each of the plurality of reputations is a reputation related to one of the processes;
    determining whether any other source can generate a reputation for the object;
    combining the plurality of reputations and the reputation generated by the any other source to create a total reputation for the object, wherein each of the plurality of reputations includes a reputation confidence and a reputation weight; and
    determining whether the object can be trusted based on the total reputation.

14. The method of claim 13, wherein a Bayesian algorithm is used to combine the plurality of reputations.

15. The method of claim 13, wherein at least one of the plurality of reputations for a sub-object was determined by combining multiple reputations for the sub-object.

16. The method of claim 13, wherein the total reputation for the object is communicated to a second electronic device.

17. The method of claim 13, further comprising:
acquiring, at the second electronic device, a plurality of reputations related to a plurality of objects connected to a network, wherein the object is included in the plurality of objects; and
combining the plurality of reputations to create a total reputation for the network.

18. A system for combining multiple reputations, the system comprising:
memory;
a hardware processor; and
a reputation module configured for:
acquiring a plurality of reputations related to an object, wherein the plurality of reputations includes at least one backend reputation, at least one service provider reputation, and at least one external reputation, wherein the object includes a plurality of sub-objects and each of the plurality of reputations corresponds to one of the plurality of sub-objects, and wherein the object is an electronic device and the sub-objects are processes running on the electronic device and each of the plurality of reputations is a reputation related to one of the processes;
determining whether any other source can generate a reputation for the object;
combining the plurality of reputations and the reputation generated by the any other source to create a total reputation for the object, wherein each of the plurality of reputations includes a reputation confidence and a reputation weight; and
determining whether the object can be trusted based on the total reputation.

19. The system of claim 18, wherein a Bayesian algorithm is used to combine the plurality of reputations.

* * * * *